(12) United States Patent
Ledet

(10) Patent No.: US 12,295,524 B2
(45) Date of Patent: May 13, 2025

(54) COOKING APPARATUS

(71) Applicant: Robert Ledet, Montegut, LA (US)

(72) Inventor: Robert Ledet, Montegut, LA (US)

(*) Notice: Subject to any disclaimer, the term of this patent is extended or adjusted under 35 U.S.C. 154(b) by 604 days.

(21) Appl. No.: 17/656,802

(22) Filed: Mar. 28, 2022

(65) Prior Publication Data

US 2022/0322876 A1 Oct. 13, 2022

Related U.S. Application Data

(63) Continuation-in-part of application No. 17/224,717, filed on Apr. 7, 2021, now Pat. No. 11,730,314.

(51) Int. Cl.
*A47J 37/06* (2006.01)
*A47J 37/07* (2006.01)
*F24C 1/02* (2021.01)

(52) U.S. Cl.
CPC ....... *A47J 37/0682* (2013.01); *A47J 37/0713* (2013.01); *F24C 1/02* (2013.01)

(58) Field of Classification Search
CPC ............... A47J 37/0647; A47J 37/0682; A47J 37/0704; A47J 37/0713; A47J 37/0727; A47J 37/0731; A47J 37/074; A47J 37/0768; A47J 36/2422; A47J 36/2427; A47J 36/245; A47J 36/2455; F24C 1/02; F24C 1/04; F24C 15/16; F24C 15/168; F23Q 2/16; A21B 3/07

See application file for complete search history.

(56) References Cited

U.S. PATENT DOCUMENTS

| | | | | |
|---|---|---|---|---|
| 2,812,415 | A * | 11/1957 | Markowitz | F24C 15/18 219/393 |
| 9,119,500 | B2 | 9/2015 | Hamlin | |
| 9,591,947 | B2 * | 3/2017 | Fogolin | A47J 37/0704 |
| 10,010,217 | B1 * | 7/2018 | Miller | A47J 37/0704 |
| 2014/0216436 | A1 * | 8/2014 | George | A47J 37/0786 126/25 R |
| 2015/0238900 | A1 * | 8/2015 | Raus | A47J 37/07 99/444 |
| 2017/0130966 | A1 * | 5/2017 | Barajas | F24B 13/02 |
| 2019/0069720 | A1 * | 3/2019 | Grand | A47J 37/0704 |
| 2019/0274479 | A1 * | 9/2019 | Chung | A47J 37/0704 |

(Continued)

OTHER PUBLICATIONS

Nexgrill, Evolution Infrared Plus 5-Burner Propane Gas Grill with Stainless Steel Side Burner, Captured from https://nexgrill.com/products/evolution-5-burner-gas-grill on Apr. 5, 2021.

(Continued)

*Primary Examiner* — Hung D Nguyen
(74) *Attorney, Agent, or Firm* — Edel Patents LLC; John B. Edel

(57) ABSTRACT

Cooking apparatus configured as a grill-griddle having a body, a lid, a cooking grate, and a griddle are described. The grill-griddle may be arranged to have a combustion space within the body and an aperture in the cooking enclosure of the grill-griddle. The aperture may be on the side of the grill-griddle and allow one or more of the grill grate and the griddle to move in and out of the cooking enclosure. The grill-griddle configuration allows for the grill grate, the griddle, or both to move laterally through such transitions enabling enhanced control and flexibility in the cooking process.

20 Claims, 4 Drawing Sheets

(56) References Cited

U.S. PATENT DOCUMENTS

| | | | |
|---|---|---|---|
| 2020/0329910 A1* | 10/2020 | Liu .................... | A47J 37/0704 |
| 2021/0085126 A1* | 3/2021 | Bartlett ............... | A47J 37/0704 |
| 2022/0113032 A1* | 4/2022 | Jiang ...................... | F24C 15/16 |

OTHER PUBLICATIONS

Barbecue Bible Kalamazoo Gourmet: Embracing the World's Oldest Cooking Method, Captured from https://barbecuebible.com/2019/08/09/wood-fire-grilling-kalamazoo-gourmet/ on Apr. 5, 2021.

\* cited by examiner

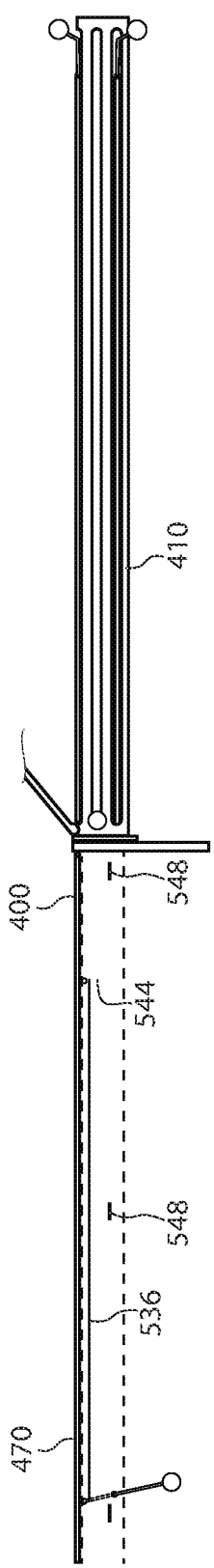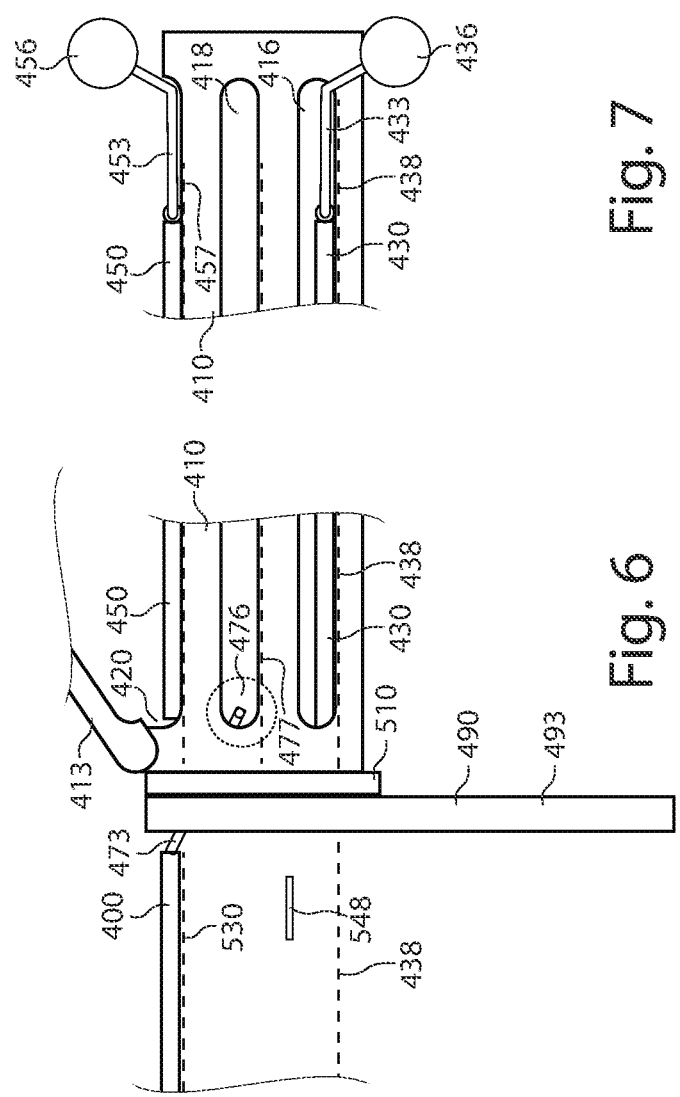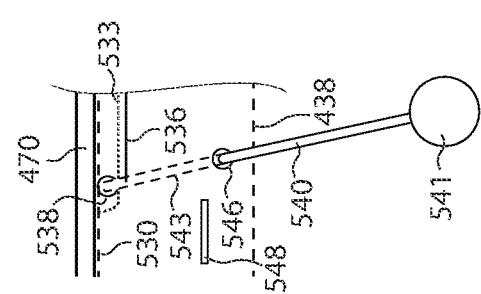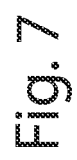
Fig. 4
Fig. 5
Fig. 6
Fig. 7

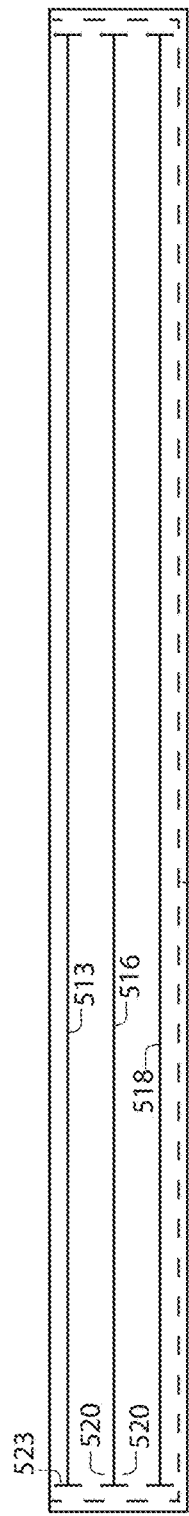
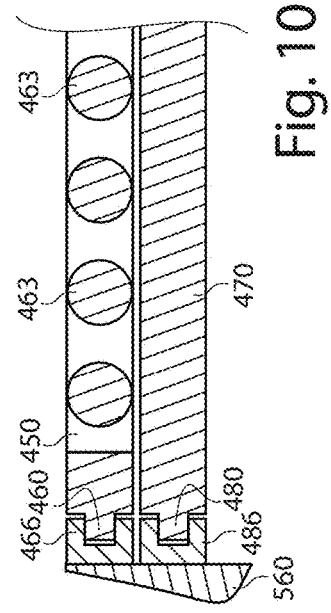
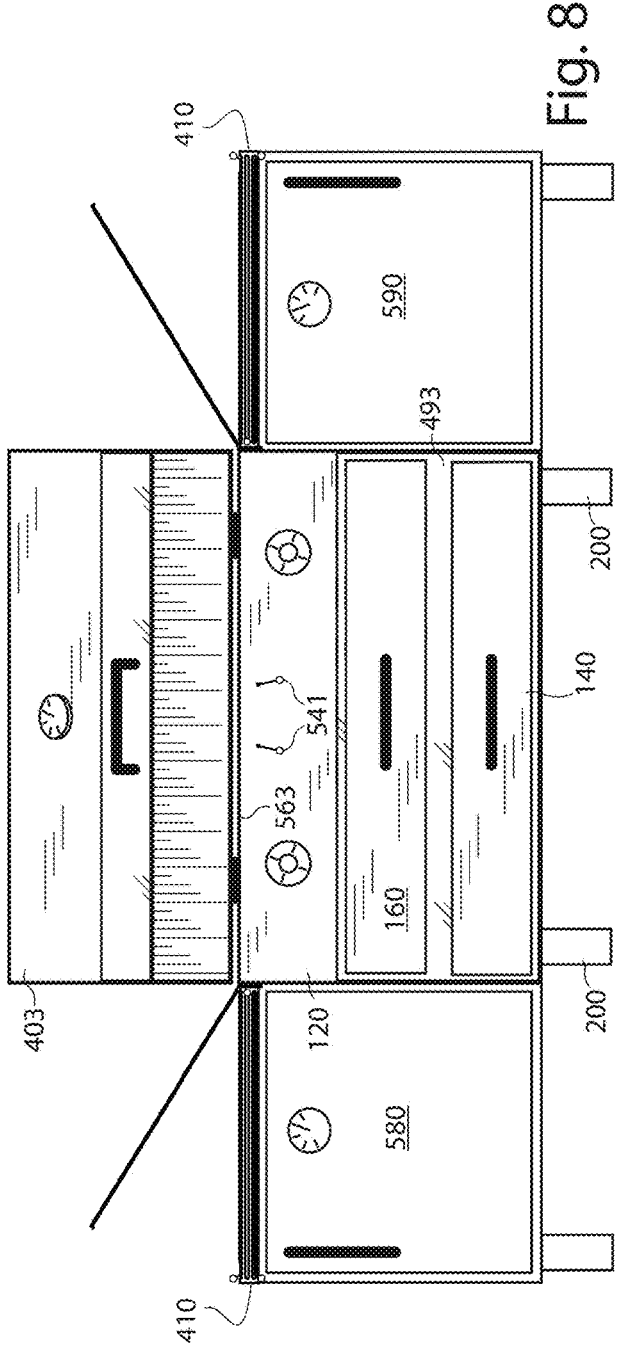

COOKING APPARATUS

Grills and grill-griddles described herein may be used in the cooking of a wide variety of foods. Certain grills described herein may have the ability to regulate radiant heat delivered from a combustion area. Certain grill-griddles described herein may have the ability to safely and conveniently switch between grill operation, griddle operation, and combinations thereof, even when the grill-griddle is operating at cooking temperature.

BRIEF DESCRIPTION OF THE DRAWINGS

FIG. 4 shows a front view of a cooking deployment system.
FIG. 5 shows a partial front view of an inner portion of a cooking deployment system.
FIG. 6 shows a partial front view of a cooking deployment system at the grill-griddle sidewall.
FIG. 7 shows a partial front view of an outer portion of a cooking deployment system.
FIG. 8 shows a front view of a grill-griddle.
FIG. 9 shows a side view of a side wall sealing system.
FIG. 10 shows a cross section of a grill grate and a griddle at an interior support wall.

DETAILED DESCRIPTION

First Example Set

Figure 1:
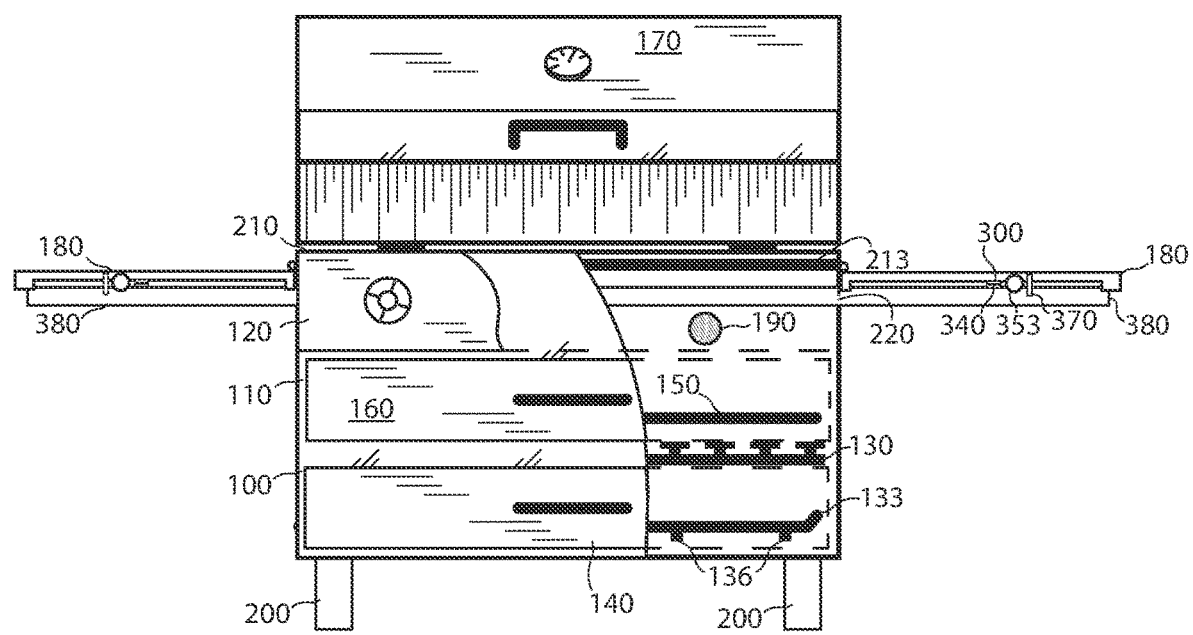
FIG. 1 shows a front view of a grill.
Figure 2:
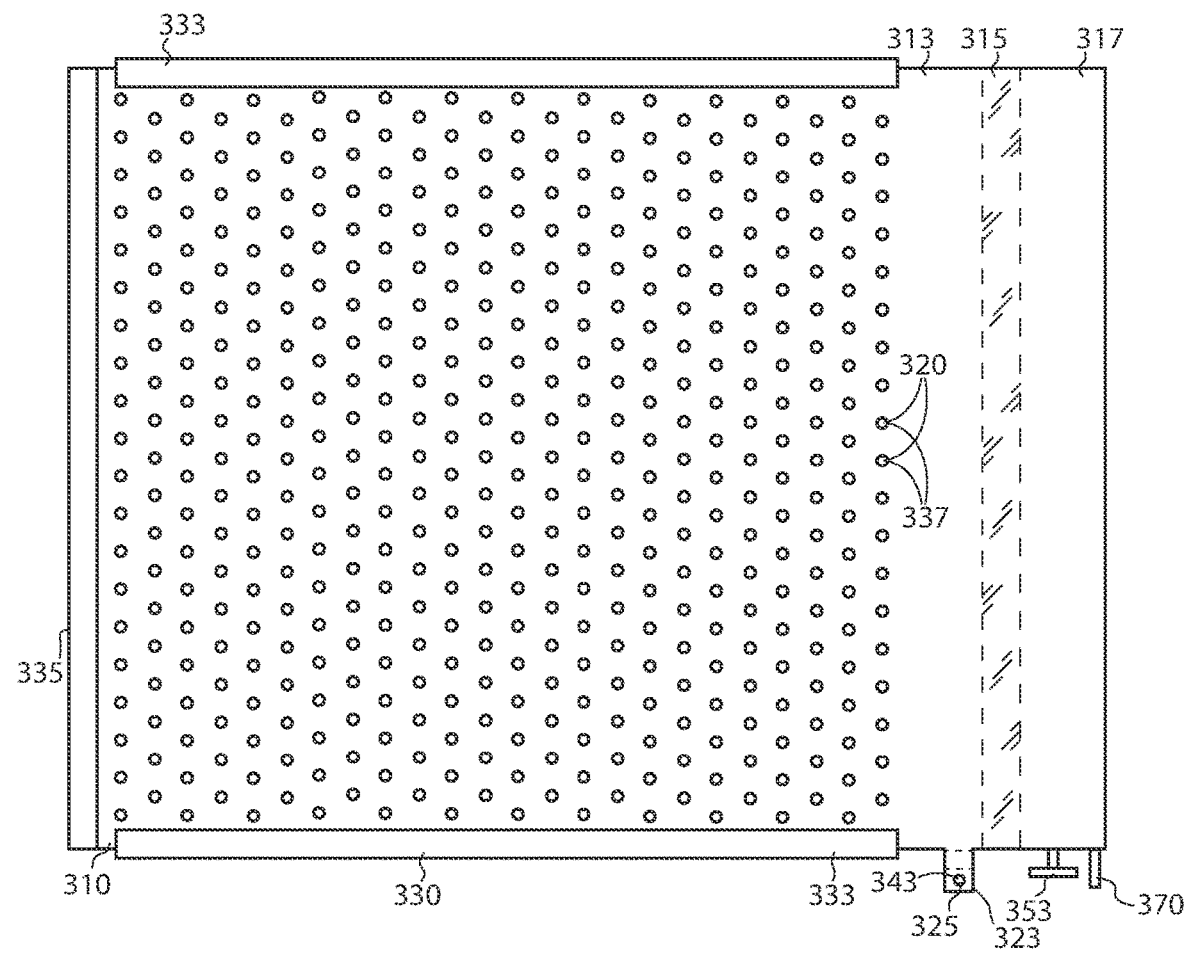
FIG. 2 shows a top view of an adjustable radiant shield.
Figure 3:
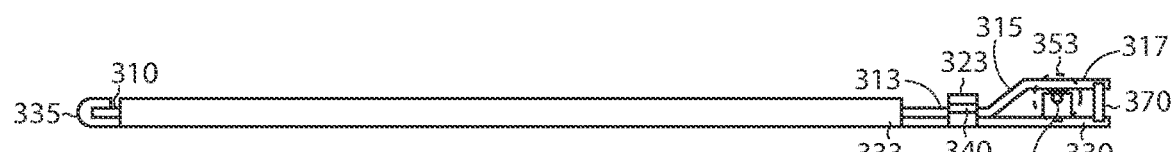
FIG. 3 shows a side view of an adjustable radiant shield.

Grill 100 may for example comprise Grill body 110, Control panel 120, Gas burners 130, Catch tray 133, Catch tray support 136, Catch tray drawer 140, Solid fuel grate 150, Solid fuel drawer 160, Grill lid 170, Grill side trays 180, Bypass exhaust 190, Legs 200, Body top opening 210, Grilling grate 213, Side aperture 220, Adjustable radiant shield 300, and Shield support 380.

Adjustable radiant shield 300 may, for example, comprise Top plate 310, Top plate main body 313, Top plate bend 315, Top plate shelf 317, Top plate holes 320, Top plate alignment tab 323, Top plate alignment hole 325, Bottom plate 330, Slide past fold-over guides 333, Slide stop fold-over guide 335, Bottom plate holes 337, Bottom plate alignment tab 340, Bottom plate alignment hole 343, Rack and pinion adjustment system 350, Overlap adjustment knob 353, and Push tab 370 with Adjustable radiant shield 300 being supported by Shield support 380.

Grill 100 may for example comprise Grill body 110 and Grill lid 170. Grill body 110 may be arranged to support Shield support 380. Shield support 380 may be a rectangular box constructed of angle iron such that the box is the approximate depth of the interior of Grill body 110 and the width of the box is approximately twice the width of Grill body 110. The angle iron may be welded together such that all horizontal components of the angle iron face the interior of the box in a manner that creates an interior ledge for the holding of a substantially rectangular sheet like objects such as Adjustable radiant shield 300. Shield support 380 may be welded to the interior of Grill body 110 at the front and the rear of Grill body 110.

Control panel 120 may be used to control the gas to Gas burners 130 which may be above Catch tray drawer 140. Catch tray 133 may be situated within Catch tray drawer 140 on Catch tray support 136 such that ash, grease, and other debris from the grilling above is collected in Catch tray 133 and may be easily be removed by opening Catch tray drawer 140 and removing Catch tray 133. Catch tray 133 may either be cleanable and replaceable or disposable. Grill lid 170 is configured to close against Body top opening 210.

Solid fuel grate 150 may be positioned within Solid fuel drawer 160 such that Solid fuel grate 150 may slide out when Solid fuel drawer 160 is opened. Solid fuel grate 150 may be positioned just above Gas burners 130 such that Gas burners 130 are configured to ignite solid fuel positioned on Solid fuel grate 150. Solid fuel grate 150 may be constructed from expanded metal grate. Thus, Grill 100 may be configured as a dual fuel grill. Alternately, Grill 100 may be configured either as a solid fuel only grill, as a gas grill, or as a propane grill. Grill 100 may alternatively be powered by other fuel sources known to the grilling and barbecue art. For example, Grill 100 may be configured as a pellet grill whether or not the grill is a dual fuel grill. Solid fuel grate 150 may, for example, be 8 inches below Grilling grate 213. The top surface of Top plate 310 at Top plate main body 313 may, for example, be between 3 and 4 inches above Solid fuel grate 150. In a related embodiment, the top surface of Top plate 310 at Top plate main body 313 may, for example, be between 1 and 7 inches above Solid fuel grate 150.

Grill side trays 180 may be arranged and configured to cover the portions of Shield support 380 outside of Grill body 110. Grill side trays 180 may also be arranged and configured to be either removed or raised. Grill side trays 180 may for example be raised on a hinge attached to Grill body 110.

Adjustable radiant shield 300 may be arranged and slidably positioned on Shield support 380 such that Adjustable radiant shield 300 may slide through Side aperture 220. Side aperture 220 may be sized to limit airflow through Side aperture 220 and may include any number of types of seals to reduce such airflow. By sliding through Side aperture 220, Adjustable radiant shield 300 may slide in and out of Grill body 110. When inserted in Grill body 110, Adjustable radiant shield 300 separates Grilling grate 213 from a combustion space which may include Solid fuel grate 150, Gas burners 130, or both. The sliding of Adjustable radiant shield 300 from an in-grill position to the external position significantly changes not only the radiant energy passing from the combustion space to Grilling grate 213 it may also significantly change the convection in the area of Adjustable radiant shield 300. Because Adjustable radiant shield 300 may be positioned between the in-grill position and the external position at a nearly unlimited number of positions, the heat transfer characteristics between the combustion space and Grilling grate 213 are similarly nearly unlimited. Push tab 370 may be welded to Bottom plate 330 of Adjustable radiant shield 300. Push tab 370 may be used to position Adjustable radiant shield 300 in a range of positions along the continuum between the in-grill position and the external position thereby varying the extent to which radiation may pass to Grilling grate 213. Top plate 310 may be configured to have Top plate holes 320 and Bottom plate 330 may be configured to have Bottom plate holes 337. Such holes may be patterned such that when Top plate 310 is properly aligned with Bottom plate 330 most or all of Bottom plate holes 337 align with Top plate holes 320. The position of Top plate 310 relative to Bottom plate 330 in which Bottom plate holes 337 achieve maximum alignment with Top plate holes 320 may be considered fully open. The diameter of individual holes along with the alignment of those holes between Top plate 310 and Bottom plate 330 determines the maximum extent of shielding of radiant energy by Adjustable radiant shield 300 and the minimum extent of shielding through Adjustable radiant shield 300. The holes may, for example, be 5/16 inch holes. The ability to move Adjustable radiant shield 300 laterally along with the ability to adjust the openness of Adjustable radiant shield 300 creates the potential for course adjustments to radiant shielding, through lateral movements, and finer adjustments to radiant shielding through adjustments to the openness of Adjustable radiant shield 300.

Because Adjustable radiant shield 300 may frequently be obscured because of its position within Grill body 110 or its position beneath Grill side trays 180, it may be difficult to ascertain the alignment of the holes. Top plate alignment tab 323 and Bottom plate alignment tab 340 may be positioned together as an alignment guide. When Bottom plate holes 337 and Top plate holes 320 are at maximum alignment, Top plate alignment hole 325 in Top plate alignment tab 323 may be aligned with Bottom plate alignment hole 343 of Bottom plate alignment tab 340. Thus, the extent of alignment of Top plate alignment hole 325 and Bottom plate alignment hole 343 may be used as a guide indicating the extent of openness of Adjustable radiant shield 300.

Adjustable radiant shield 300 may be configured such that Top plate 310 is configured to slide within certain confines dictated by the configuration of Bottom plate 330. Top plate 310 may slide between two Slide past fold-over guides 333 which may be portions of the sheet metal from which Bottom plate 330 is constructed folded over in a way that guides the movement of Top plate 310. Similarly, Slide stop fold-over guide 335 may serve both to restrain the movement of Top plate 310 and act as a stop limiting the lateral movement of Top plate 310 relative to Bottom plate 330. The Adjustable radiant shield 300 may operate in a number of ways which allow for relative or sliding motion comparable to the motion described. Such configurations may include tongue and groove relationships between Top plate 310 and Bottom plate 330 or may include tongue and groove relationships between one or both of Top plate 310 and Bottom plate 330 and various components of Grill body 110.

Top plate 310 may be arranged both parallel and adjacent to Bottom plate 330. Top plate 310 may be configured such that it has a Top plate main body 313, a Top plate bend 315, and a Top plate shelf 317. A combination of these three elements creates a space between Top plate 310 and Bottom plate 330 on the side of Adjustable radiant shield 300 opposite Slide stop fold-over guide 335. Overlap adjustment knob 353 may be constructed such that it is in a fixed position relative to Bottom plate 330 and such that it drives a Rack and pinion adjustment system 350. Rack and pinion adjustment system 350 may include more than one rack and pinion gear systems configured to adjust the relative position of Bottom plate 330 to Top plate 310 by way of turning Overlap adjustment knob 353.

Because Adjustable radiant shield 300 may have the ability to close off upward traveling exhaust entirely, a Bypass exhaust 190 may be present and may serve to reroute combustion exhaust gases around Adjustable radiant shield 300 when the direct flow path from Solid fuel grate 150 to Grilling grate 213 is limited. The ability to reroute combustion exhaust may be utilized during operation of the grill. For example, Adjustable radiant shield 300 may be positioned within the grill prior to opening the grill such that a person operating the grill may avoid significant exposure to the combustion exhaust while tending to the food.

Shield support 380 may, for example, be 72 inches wide inside the track created by Shield support 380. Shield support 380 may, for example, be 19⅛ inches deep inside the track created by Shield support 380. Adjustable radiant shield 300 may be 18¾ inches deep from the outside of Slide past fold-over guides 333 to the outside of Slide past fold-over guides 333. Top plate main body 313 may be 16 inches wide and Top plate 310 may be 20 inches wide including Top plate main body 313, Top plate bend 315, and Top plate shelf 317. The space in which Rack and pinion adjustment system 350 operates, namely the space between Top plate shelf 317 and Bottom plate 330 may be 1⅝ inches tall. In total the dimensions for Grilling grate 213 may be 19⅛ inches by 31½ inches. There may, for example be 7 inches separating Adjustable radiant shield 300 and Gas burners 130.

Adjustable radiant shield 300 may be used in the cooking of various foods. For example, Adjustable radiant shield 300 may be in the out of grill position during an initial period of cooking in which meat or some other food is seared or caramelized. Adjustable radiant shield 300 may then be moved into place beneath the food to allow the meat or other food to complete the cooking while exposed to a lesser degree of radiant heat. In a related example, foods that require different intensities of cooking may be cooked adjacent to one another by positioning food that requires a lower intensity of radiant heat to the outside of the food that requires the higher intensity of radiant heat. Adjustable radiant shield 300 may then be slid along Shield support 380 until Adjustable radiant shield 300 is below the food requiring a lower intensity of radiant heat, but not below the food requiring the higher intensity heat. Different intensities of radiant heat may be applied in different areas allowing cooking of foods with different heating requirements adjacent to one another. This may be accomplished by positioning food that requires a lower intensity of radiant heat above Adjustable radiant shield 300 while food that requires a higher level of radiant heat is directly exposed to the radiant heat without shielding by Adjustable radiant shield 300. In certain circumstances the timely application of Adjustable radiant shield 300 to control the radiant heat may allow food to finish cooking on a hot grill without burning the food.

In certain embodiments, the area percentage of the cooking grate that may be obscured from the combustion space by the radiant shield may be greater than 30%. In certain embodiments, the area percentage of the cooking grate that may be obscured from the combustion space by the radiant shield may be greater than 50%. In certain embodiments, the area percentage of the cooking grate that may be obscured from the combustion space by the radiant shield may be greater than 70%.

In certain embodiments, the aperture through which the radiant shield passes into the body of the grill may have a width that is at least four times greater than its height. In certain embodiments, the aperture through which the radiant shield passes into the body of the grill may have a width that is at least 10 times greater than its height.

In certain embodiments, the radiant shield may be adjusted such that 5% of the radiant shield is open to radiation passing from the combustion area to the grill grate. In certain other embodiments, the radiant shield may be adjusted such that 10% of the radiant shield is open to radiation passing from the combustion area to the grill grate. In certain other embodiments, the radiant shield may be adjusted such that 15% of the radiant shield is open to radiation passing from the combustion area to the grill grate.

Grills described herein may, for example, comprise a body; a lid; a cooking grate; a combustion space within the body; a first plate; and an aperture in the body such that the lid and the body form a cooking enclosure; the cooking grate is substantially parallel to the first plate; the first plate is configured to move within the aperture; and the first plate is configured to move in and out of the cooking enclosure thereby limiting the extent of radiant flux between the combustion space and cooking grate based on the extent to which the first plate is in the cooking enclosure. In a related example, first plate comprises a first plurality of openings through which radiant heat may pass. In a related example, the grill may include a second plate such that the second plate may be substantially parallel to the cooking grate. In a related example, the grill may include a second plate such that the second plate includes a second plurality of openings through which radiant heat may pass. In a related example, the grill may burn charcoal and a fuel selected from propane and natural gas. The solid fuel may, for example, be lit with propane burners and the propane burners may be constructed from 1½" round cylinders with multiple orifices. The burners may be designed to heat the full horizontal area covered by the combustion space. The solid fuel may be logs or woodchips. The cooking apparatus of this example set and those of the second example set may utilize any number of combinations of combustion configurations described herein.

Grills described herein may, for example, comprise a body; a lid; a cooking grate; a combustion space within the body; a first plate; and a second plate such that the first plate includes a first plurality of openings through which radiant heat may pass; the second plate may include a second plurality of openings through which radiant heat may pass; the lid and the body may form a cooking enclosure; the cooking grate may be substantially parallel to the first plate; the cooking grate may be substantially parallel to the second plate; the first plate may be arranged and configured for motion relative to the second plate such that the first plurality of openings may alternatingly align and offset with the second plurality of openings thereby varying the rate of transmission of thermal radiation between the combustion space and the cooking grate; and the first plate and the second plate may be arranged and configured to move together relative to the body thereby varying the rate of transmission of thermal radiation between the combustion space and the cooking grate. In a related example, the first plate and second plate may be arranged and configured to move through an aperture in a wall of the body. In a related example, the first plate may be arranged and configured to engage in a sliding motion relative to the second plate. In a related example, a face of the first plate may be in contact with a face of the second plate. In a related example, the motion of the first plate may be controlled from outside of the base. In a related example, the motion of the second plate may be controlled from outside of the base. In a related example, the position of the first plate relative to the second plate may be adjusted by a rack and pinion adjustment.

As that phrase is used herein "substantially parallel" indicates a deviation from parallel of less than 15°.

Second Example Set

As depicted in FIGS. 4-9 Cooking deployment system 400 as part of Grill-griddle 403 may include elements such as: Control panel 120, Catch tray drawer 140, Solid fuel drawer 160, Legs 200, Storage rack 410, Storage rack cover 413, Storage rack bottom opening 416, Storage rack middle opening 418, Storage rack top opening 420, Radiant shield 430, Radiant shield push pull rod 433, Radiant shield slide handle 436, Radiant shield support rail 438, Grill grate 450, Grill push pull rod 453, Grill slide handle 456, Grill storage rails 457, Griddle 470, Griddle push pull rod 473, Griddle slide handle 476, Griddle storage rails 477, Grill-griddle side wall 490, Grill-griddle body 493, Side wall sealing system 510, Sealing system grill opening 513, Sealing system griddle opening 516, Sealing system radiant shield opening 518, Sealing sweeps 520, Side slits 523, Storage rack attachment location 526, Grill-griddle elevator rails 530, Elevator guidewire 533, Elevator lever connecting rod 536, Elevator rail cross grill-griddle support rod 538, Elevator lever 540, Elevator lever handle 541, Interior portion of elevator lever handle 543, Internal complementary lever 544 Elevator lever pivot 546, Elevator lower-level bracket 548, Side smoker 580 and Side wanner 590. As that phrase is used herein "cooking apparatus" encompasses grills, griddles, and combinations thereof. As that phrase is used herein, "grill-griddle" indicates a cooking apparatus having both a grill and a griddle. Versions of the grill-griddle described in this example set may have a variety of features equivalent to those describing the grill in the first example set to the extent that those features are compatible. For example, features such as the gas burners, the catch tray, the solid fuel grate, the solid fuel drawer, and the bypass exhaust may be employed individually, collectively, or in selective combinations.

The grill-griddle may come with or without additional modular units attached to the side of the grill-griddle. Namely, storage cabinets, pellet grill equipment housing, side smokers, and side warmers may be attached to the sides. The grill-griddle may have none of these options, one of these options or two of these options in any combination. Such optional equipment and configurations may also apply to the various grills of the first example set. In the case of smokers and warmers a porthole may connect the combustion space to the modular unit. In the case of pellet grill equipment, individual components may cross between the combustion space in the modular unit. The units may be modular in that those units may be attached to the grill or the grill-griddle with minimal need for mechanical skill and such that the various types of units may by interchangeable. The modular units may, for example, be attached by two sizes of channel iron or square tubing such that one size of the iron associated with the grill will slide around or into the other size of iron associated with the modular units. The configuration of the channel iron, square tubing or other similarly functioning components may be such that the modular unit aligns with its final installed location and such that any openings between the modular unit and the grill or grill-griddle are correctly aligned. Additional gaskets and seals may be used between the grill or grill-griddle and the modular units. In cases where no modular units are installed, a blank plate or sheet may be inserted for use as the portion of the sidewall associated with the location where the modular units may be located.

The storage rack may be used to intermittently house the grill grate, the griddle, and the radiant shield. In certain cases, the storage rack may house only the grill grate and the griddle. The storage rack is a secure space allowing for selected components such as the grill grate, the griddle, and the radiant shield to each independently or substantially independently slide into and out of the body of the grill-griddle for use in cooking. The storage rack cover may be used over the storage rack and any components stored within the storage rack such that the storage rack may serve as a side table or working surface adjacent to the cooking area of a combination grill-griddle. A storage rack bottom opening may be used as an access point for the purpose of controlling the position of the radiant shield. The storage rack middle opening may be used as an access point for the purpose of controlling the position of the griddle. The storage rack top opening may be used as an access point for the purpose of controlling the position of the grill grate. A radiant shield capable of sliding in and out of a combination grill-griddle may be configured as a simple single sheet with openings, as a more complicated apparatus such as those described in the first example set, or as any variety of other configurations capable of limiting radiant heat in the cooking area.

The radiant shield when present may be fully inserted into the grill-griddle body, partially inserted into the grill-griddle body, or fully removed from the grill-griddle body and may be positioned at various locations along that range of motion either in increments or in a continuous fashion. A radiant shield push pull rod having a radiant shield slide handle may be used for the purpose of controlling the position of the radiant shield along that range of motion. The radiant shield may operate on top of a radiant shield support rail or along any number of other various support structures that facilitate the above-described movement. The grill grate may undergo a similar type of motion when operated by the grill push pull rod and grill slide handle. The griddle may operate by way of a griddle push pull rod attached to the griddle side handle in a manner comparable to the operation of the grill grate and the radiant shield to move through the grill-griddle side wall.

The griddle may be substantially parallel to the grill grate when the grill grate is in a cooking position. The griddle may be substantially parallel to the grill grate when the griddle is in a cooking position. The griddle may be substantially parallel to the radiant shield when the griddle is in a cooking position. This parallel configuration may occur when the radiant shield is inside the grill-griddle body or when it is outside of the grill-griddle body. The grill grate may be substantially parallel to the radiant shield when the grill grate is in a cooking position. This parallel configuration may occur when the radiant shield is inside the grill-griddle body or when it is outside of the grill-griddle body. Further, the griddle may remain substantially parallel to the grill grate as the griddle transitions from inside the grill-griddle body to outside the grill-griddle body. Similarly, the grill grate may remain substantially parallel to the griddle as the grill grate transitions from inside the grill-griddle body to outside the grill-griddle body.

To avoid excessive air intrusion and/or escaping heat from the combination grill-griddle a side wall sealing system may be used. That system may have a sealing system grill opening through which the grill grate may pass, a sealing system griddle opening through which the griddle may pass and a sealing system radiant shield opening through which the radiant shield may pass. In some cases, more than one of the grill grate, the griddle, and the radiant shield may pass through a common opening. Sealing sweeps may be part of the sealing system for the purpose of minimizing airflow in and out of the combination grill-griddle body. These sealing sweeps may come in a variety of configurations and if constructed from a single sheet of material may have side slits allowing the sweeps to operate evenly across the grill grate, griddle, or radiant shield with which it is interacting. The side slits may also serve to accommodate push pull rods as may be needed. When a grill grate or griddle is stored below the level at which it would be used to cook, the side slit may be used to accommodate the push pull rod associated with the grill grate or griddle that is raised or lowered. The storage rack may be attached to the combination grill-griddle body either through or by way of the side wall sealing system at a storage rack attachment location.

In cases where it is preferred to have the top of the grill grate and the top of the griddle operate at approximately the same height, an elevator system may be used. While the number of systems that may be used to change the elevation of a griddle or grill grate are numerous, one such example of how to raise or lower a griddle involves moving grill-griddle elevator rails by operating an elevator lever using an elevator lever handle. A pair of elevator rail cross grill-griddle support rods may run underneath the grill-griddle elevator rails which in turn support either the grill grate or the griddle. So that the elevator rail cross grill-griddle support rods do not cause the grill-griddle elevator rails to move laterally when the grill-griddle elevator rails are being displaced vertically, the elevator rail cross grill-griddle support rod (538) may slide within elevator guidewires. Elevator lever connecting rods may be used such that the interior portion of the elevator lever handle and other associated internal complementary levers act in concert to raise and lower the grill-griddle elevator rails. The elevator lever pivot may be both the place where the elevator lever transitions from inside the combination grill-griddle to outside and the pivot point around which the elevator lever operates to adjust the position of grill-griddle elevator rails. The elevator lower-level brackets may be positioned such that they catch and support the grill-griddle elevator rails at a lower level aligned with the bottom of the griddle when the griddle is in the storage position. This allows the griddle to slide from the grill-griddle elevator rails onto the griddle storage rails and vice versa. Similarly, the grill grate may slide from the grill storage rails onto the grill-griddle elevator rails and vice versa. When an operator of the combination grill-griddle desires to change from cooking with the griddle to cooking with the grill grate, the grill-griddle elevator rails may be lowered onto the elevator lower-level brackets using the elevator lever handle, then the griddle slide handle may be used to pull the griddle into the storage rack, then the grill-griddle elevator rails may be raised back to cooking level so that the grill grate may be slid into cooking position through the operation of the grill slide handle.

The method of raising and lowering the grill-griddle elevator rails described above is one of a number of possible examples for vertically displacing either the grill grate or the griddle so that the grill grate or griddle is at a location that is optimal for cooking. In many cases, that optimal level will be within ½ inch of the front lip of the combination grill-griddle. Alternate methods of adjusting the vertical position may include worm drives, rack and pinion configurations, linear actuators, other lever configurations, pulleys, springs, ramps, and pistons. Such devices may be operated in a variety of ways including by electric motor, hydraulics, and manual operation.

The method of horizontally moving individual components such as the grill grate, the griddle and the radiant shield described above is one of several possible examples for horizontally displacing those components so that each of the components is at a location that is optimal for cooking. Alternate methods of adjusting the horizontal position may include worm drives, rack and pinion configurations, linear actuators, other lever configurations, pulleys, and pistons. Such devices may be operated in a variety of ways including by electric motor, hydraulics, and manual operation.

The sidewall sealing system may take many forms. In certain examples, the sidewall sealing system may be constructed from a single sheet of gasket material having thermal properties sufficient to sustain an effective seal through significant duration of high temperature operation. Individual openings may be made in the gasket material to create the sealing sweeps described above. Polymer materials may be used in the construction of the sealing system. Fibrous materials may also be used including air laid and woven fibrous materials. Among the examples of fibrous materials usable in the sidewall sealing system are fiberglass and rockwool.

A variety of configurations and styles of sealing sweep may be used for the purpose of reducing the flow of air in and out of the grill-griddle body through the various sealing system openings. Sweeps may be constructed from bristled material, porous materials such as foams, as well as rigid materials having some suspension system. Such suspension systems may be used to hold either a flexible or rigid sealing component in a position that limits airflow. For example, a spring steel device may fit snugly against the grill or griddle when the grill or griddle is passing through the opening and close around the grill or griddle to substantially obscure the opening when the grill or griddle is either fully inside of or outside of the grill-griddle. The number of possible configurations is quite large and configurations for individual sweeps may be used redundantly or in combinations with one another. As that phrase is used herein "sweep" indicates an apparatus which restricts airflow through a pathway that would otherwise be more open to such airflow. The phrase is a generalization of the narrower category of apparatus known as door sweeps.

While the grill grate, griddle, and radiant shield each are described as operating on rails, they may operate on a variety of equipment or mechanical components that include rails. Further, "rails" as that term is used herein indicates bars, rods, tracks, and other similar equipment along which items may be moved. Rails which may be used in the grill-griddle include angle iron, flat bar stock and various channel materials like C channel and E channel. Alternatively, the grill grate, griddle, and radiant shield may be moved over rollers, slid over individual support points, or by other comparable mechanical support means compatible with sliding motion.

In certain other embodiments such as depicted in FIG. 10, Grill grate 450 may have Grill tongue sides 460, and Individual grill grates 463 such that it is configured to interface with Grill grate groove tracks 466 in a tongue and groove fashion. Similarly Griddle 470 may have Griddle tongue sides 480 configured to interface with Griddle groove tracks 486 in a tongue and groove fashion. Grill grate groove tracks 466 and Griddle groove tracks 486 may be attached to Interior support wall 560. In a configuration where the grill grate and the griddle slide in and out of the cooking enclosure, the tongue and groove tracks would run parallel to the direction of sliding motion of the grill grate and the griddle. This configuration, and other similar configurations in which the tracks do not protrude below the level of the bottom of the grill or griddle being supported, minimize the total thickness of the grill grate or griddle when the associated tracks are included in the total thickness. By minimizing the total thickness of sliding components and rails, the grill grate and the griddle may be operated and used while minimizing the height difference between the top cooking surfaces of the griddle and the grill grate. That difference may be less than an inch and, in some cases, may be less than 0.5 inches. The height difference between the top of the grill grate and the grill-griddle top lip when the grill grate is in a cooking position may be less than 0.5 inches. The height difference between the top of the griddle and the grill-griddle top lip when the griddle is in a cooking position may be less than 0.5 inches.

In certain embodiments the griddle may be positioned above the grill grate such that sliding of the griddle in and out of the grill-griddle body allows for a continuous or incremental positioning and utilization of the griddle above the grill grate such that a large number of variations on the relative cooking surface area allocated to the griddle versus the grill may be achieved. In some of those embodiments, the griddle moves in and out of the grill-griddle body without need for movement of the grill grates to transition between griddle operation and grill grate operation.

The griddle may be configured with enough of a lip that liquids on the griddle do not drain into the storage rack. The grill-griddle may further be equipped with a drip tray located such as not to impinge the movement of any of the griddle, grill grate, or radiant shield.

As that term is used herein "aperture" designates an opening, such as a hole, gap, slit, or slot. As used herein, aperture does not include large openings such as those caused by removal or opening of a grill-griddle lid during cooking.

As that phrase is used herein "transition level" indicates the horizontally extending space bounded by a horizontal plane 3 inches above the primary aperture through which the grill or cooking grate passes and another horizontal plane 3 inches below the primary aperture through which the grill or cooking grate passes.

Cooking apparatus described herein may, for example, comprise a body; a lid arranged such that the lid and the body form a cooking enclosure; a cooking grate; a griddle; a combustion space within the body; and an aperture in the cooking enclosure; such that the cooking grate is configured to move within the aperture; such that the cooking grate is configured to transition from principally within the cooking enclosure to principally external to the cooking enclosure while remaining within a transition level; and such that the griddle is configured to transition from substantially within the cooking enclosure to substantially external to the cooking enclosure while remaining within the transition level. In a related example, the cooking apparatus may burn charcoal and a fuel selected from propane and natural gas. In a related example, the aperture may be partially blocked by a sweep. In a related example, the aperture may be arranged and configured to restrict airflow. In a related example, a flexible sealing component may be located at the aperture. In a related example, a flexible sealing component may be located at the aperture such that the flexible sealing component is arranged and configured to flex in response to the motion of the cooking grate moving through the aperture. In a related example, the griddle may be arranged to be substantially parallel to the cooking grate. In a related example, the cooking apparatus may have a first set of tracks within the cooking enclosure and a second set of tracks external to the cooking enclosure such that the first set of tracks is substantially parallel to the second set of tracks. In a related example, the cooking apparatus may have a lifting mechanism configured to vertically displace an element selected from the cooking grate and the griddle. In a related example, the cooking apparatus may have a modular unit attached to a side of the cooking enclosure such that the modular unit is selected from a smoker and a wanner.

Cooking apparatus described herein may, for example, comprise a body; a combustion space within the body; a lid configured such that the lid and the body form a cooking enclosure; a cooking grate; a griddle; and a first plate configured to limit the extent of radiant flux delivered to an element selected from the cooking grate and the griddle; such that the cooking grate is configured to move in and out of the cooking enclosure through an aperture and through a side of the cooking enclosure and such that the cooking grate is configured to move in and out of the cooking enclosure through the side of the cooking enclosure. In a related example, the cooking apparatus may burn a solid fuel ignited by a gaseous fuel. In a related example, the aperture may be partially blocked by a sweep. In a related example, the aperture may be arranged and configured to restrict airflow. In a related example, a flexible sealing component may be located at the aperture. In a related example, a flexible sealing component may be located at the aperture such that the flexible sealing component is arranged and configured to flex in response to the motion of the cooking grate moving through the aperture. In a related example, the griddle may be arranged to be substantially parallel to the cooking grate. In a related example, the cooking apparatus may have a first set of tracks within the cooking enclosure and a second set of tracks external to the cooking enclosure such that the first set of tracks is substantially parallel to the second set of tracks. In a related example, the cooking apparatus may have a lifting mechanism configured to vertically displace an element selected from the cooking grate and the griddle. In a related example, the cooking apparatus may have a modular unit attached to the side of the cooking enclosure such that the modular unit is selected from a smoker and a warmer.

Cooking apparatus described herein may, for example, comprise a body; a lid configured such that the lid and the body form a cooking enclosure; a cooking grate; a griddle; a combustion space within the body; and an aperture in the cooking enclosure; such that the griddle is configured to move within the aperture; such that the griddle is configured to transition from principally within the cooking enclosure to principally external to the cooking enclosure while remaining within a transition level; and such that an upper surface of the cooking grate is within 1 inch of an upper surface of the griddle when the griddle is principally within the cooking enclosure. In a related example, the upper surface of the cooking grate may be within 0.5 inches of the upper surface of the griddle when the griddle is principally within the cooking enclosure.

The above-described embodiments have a number of independently useful individual features that have particular utility when used in combination with one another including combinations of features from embodiments described separately. There are, of course, other alternate embodiments which are obvious from the foregoing descriptions, which are intended to be included within the scope of the present application.

The invention claimed is:

1. A cooking apparatus comprising
   a. a body;
   b. a lid wherein the lid and the body form a cooking enclosure;
   c. a cooking grate; and
   d. a griddle;
   e. a combustion space within the body; and
   f. an aperture in the cooking enclosure;
   g. wherein the cooking grate is configured to move within the aperture;
   h. wherein the cooking grate is configured to transition from principally within the cooking enclosure to principally external to the cooking enclosure while remaining within a transition level; and
   i. wherein the griddle is configured to transition from substantially within the cooking enclosure to substantially external to the cooking enclosure while remaining within the transition level.

2. The cooking apparatus of claim 1 wherein the cooking apparatus burns charcoal and a fuel selected from propane and natural gas.

3. The cooking apparatus of claim 1 wherein the aperture is partially blocked by a sweep.

4. The cooking apparatus of claim 1 wherein the aperture is arranged and configured to restrict airflow.

5. The cooking apparatus of claim 1 wherein a flexible sealing component is located at the aperture.

6. The cooking apparatus of claim 1 wherein a flexible sealing component is located at the aperture and wherein the flexible sealing component is arranged and configured to flex in response to the motion of the cooking grate moving through the aperture.

7. The cooking apparatus of claim 1 wherein the griddle is arranged to be substantially parallel to the cooking grate.

8. The cooking apparatus of claim 1 further comprising a first set of tracks within the cooking enclosure and a second set of tracks external to the cooking enclosure wherein the first set of tracks is substantially parallel to the second set of tracks.

9. The cooking apparatus of claim 1 further comprising a lifting mechanism configured to vertically displace an element selected from the cooking grate and the griddle.

10. The cooking apparatus of claim 1 further comprising a modular unit attached to a side of the cooking enclosure wherein the modular unit is selected from a smoker and a warmer.

11. A cooking apparatus comprising
    a. a body;
    b. a combustion space within the body;
    c. a lid configured such that the lid and the body form a cooking enclosure;
    d. a cooking grate;
    e. a griddle; and
    f. a first plate configured to limit the extent of radiant flux delivered to an element selected from the cooking grate and the griddle;
    g. wherein the cooking grate is configured to move in and out of the cooking enclosure through an aperture and through a side of the cooking enclosure; and
    h. wherein the cooking grate is configured to move in and out of the cooking enclosure through the side of the cooking enclosure.

12. The cooking apparatus of claim 11 wherein the cooking apparatus burns a solid fuel ignited by a gaseous fuel.

13. The cooking apparatus of claim 11 wherein the aperture is partially blocked by a sweep.

14. The cooking apparatus of claim 11 wherein the aperture is arranged and configured to restrict airflow.

15. The cooking apparatus of claim 11 wherein a flexible sealing component is located at the aperture.

16. The cooking apparatus of claim 11 further comprising a first set of tracks within the cooking enclosure and a second set of tracks external to the cooking enclosure wherein the first set of tracks is substantially parallel to the second set of tracks.

17. The cooking apparatus of claim 11 further comprising a lifting mechanism configured to vertically displace an element selected from the cooking grate and the griddle.

18. The cooking apparatus of claim 11 further comprising a modular unit attached to the side of the cooking enclosure wherein the modular unit is selected from a smoker and a warmer.

19. A cooking apparatus comprising:
  a. a body;
  b. a lid wherein the lid and the body form a cooking enclosure;
  c. a cooking grate; and
  d. a griddle;
  e. a combustion space within the body; and
  f. an aperture in the cooking enclosure;
  g. wherein the griddle is configured to move within the aperture;
  h. wherein the griddle is configured to transition from principally within the cooking enclosure to principally external to the cooking enclosure while remaining within a transition level; and
  i. wherein an upper surface of the cooking grate is within 1 inch of an upper surface of the griddle when the griddle is principally within the cooking enclosure.

20. The cooking apparatus of claim 19 wherein the upper surface of the cooking grate is within 0.5 inches of the upper surface of the griddle when the griddle is principally within the cooking enclosure.

\* \* \* \* \*